United States Patent [19]

Okawara

[11] Patent Number: 4,530,169

[45] Date of Patent: Jul. 23, 1985

[54] GAS DISTRIBUTING FLOOR FOR CIRCULATING FLUIDIZED-BED DRYERS OR THE LIKE

[75] Inventor: Mikio Okawara, Shizuoka, Japan

[73] Assignee: Kabushiki Kaisha Okawara Seisakusho, Shizuoka, Japan

[21] Appl. No.: 487,747

[22] Filed: Apr. 22, 1983

[30] Foreign Application Priority Data

Apr. 26, 1982 [JP] Japan .................................. 57-70152

[51] Int. Cl.³ .............................................. F26B 17/10
[52] U.S. Cl. .................................... 34/57 E; 34/57 B; 34/57 D
[58] Field of Search .................. 406/88, 137; 239/143; 222/195; 34/10, 57 A, 57 B, 57 C, 57 E

[56] References Cited

U.S. PATENT DOCUMENTS 2,847,766  8/1958  Silver .................................. 34/57 E
3,817,696  6/1974  Hereth .............................. 34/57 E Primary Examiner—Larry I. Schwartz
Attorney, Agent, or Firm—Bucknam & Archer

[57] ABSTRACT

A gas distributing floor for use in a circulating fluidized-bed dryer, incinerator or the like includes a number of elongate baffling plates joined at opposite edges with, and disposed circumferentially between, a circular disc and an annular plate in overlapping relation to one another. Each of the baffling plates has a pair of upper and lower portions and an intermediate portion extending obliquely between the upper and lower portions, the upper portion of each baffling plate overlying the lower portion of an adjacent one of the baffling plates so as to define therebetween an elongate orifice for the passage therethrough of gas.

6 Claims, 3 Drawing Figures

GAS DISTRIBUTING FLOOR FOR CIRCULATING FLUIDIZED-BED DRYERS OR THE LIKE

BACKGROUND OF THE INVENTION

1. Field of the Invention

The present invention relates to a gas distributing floor for a circulating fluidized-bed dryer, incinerators or the like.

2. Description of the Prior Art

In circulating fluidized-bed dryers shown in Japanese Patent Publication Nos. 47-12997 and 47-49854 published on Apr. 20, 1972 and Dec. 14, 1972, respectively, gas distributing floors have a number of baffling plates arranged radially on the floor body at uniform intervals and extending over corresponding pores or orifices in the body so as to direct gas flows through the orifices to a common direction to cause a circulating fluidized bed. The known floors are incapable of performing in an entirely satisfactory manner, insofar as, in those floors, hot air circulates substantially slower at the central portion of the floor than at the peripheral portion of the floor. Such difference in the circulating speed results in the solid particles drying unevenly. Further, such solid particles placed initially on the floor between adjacent baffling plates are not subjected to the flows of hot air directly so that uniform drying of the solid particles is difficult to achieve.

SUMMARY OF THE INVENTION

According to the present invention, a gas distributing floor for a circulating fluidized-bed dryer or the like, comprises a number of elongate baffling plates joined at opposite ends with and disposed circumferentially between an annular plate and a circular disc in overlapping relation to one another. Each of the baffling plates has a pair of upper and lower portions extending longitudinally thereof and an intermediate portion extending obliquely between the upper and lower portions, the upper portion of each baffling plate overlying the lower portion of an adjacent one of the baffling plates so as to define therebetween an elongate orifice for the passage therethrough of gas.

It is an object of the present invention to provide a gas distributing floor for circulating fluidized-bed dryers, incinerators or the like in which hot air can flow uniformly over the floor at a relatively higher speed of circulation within a reactor chamber.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
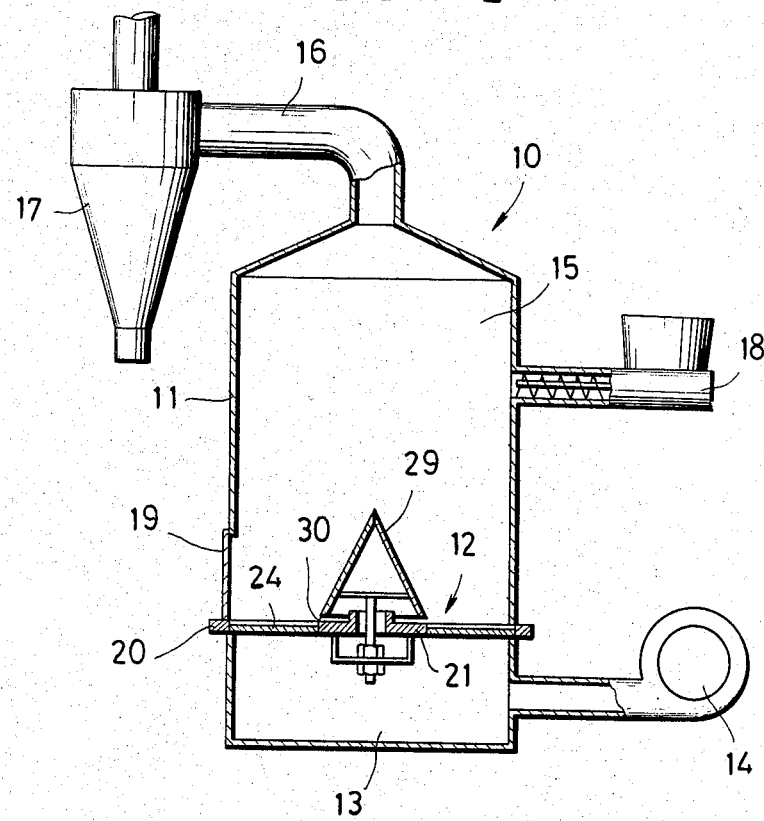
FIG. 1 is a schematic front elevational view, partly in cross section, of a circulating fluidized-bed dryer having a gas distributing floor according to the present invention.

As shown in FIG. 1, a circulating fluidized-bed dryer 10 includes a container 11 for containing a bed of solid particles (not shown) on a slited gas distributing floor 12. A plenum chamber 13 is disposed below the floor 12 so that pressurized hot air introduced into the plenum chamber 13 by a blower 14 flows upwardly thereby fluidizing the particles. That is, the particles are separated from one another and agitated by the circulating air thereby forming a so-called circulating fluidized bed in a reaction chamber 15 disposed above the floor 12. An exhaust duct 16 is connected at one end to the top of the container 11 and at the opposite end to a dust collector 17 so that exhaust gas introduced through the duct 16 into the dust collector 17 is filtered and discharged out of the dryer 10. Solid particles to be dried are introduced into the reaction chamber 15 by a suitable loading means such as a screw conveyer 18 and dried solid particles are discharged from the outlet or discharge port 19 out of the dryer 10. The conveyor 18 is controlled to adjust the amount of feed of the solid particles to be dried in response to the temperature in the reactor chamber 15, the moisture content of the dried solid particles, and other related parameters.

Figure 2:
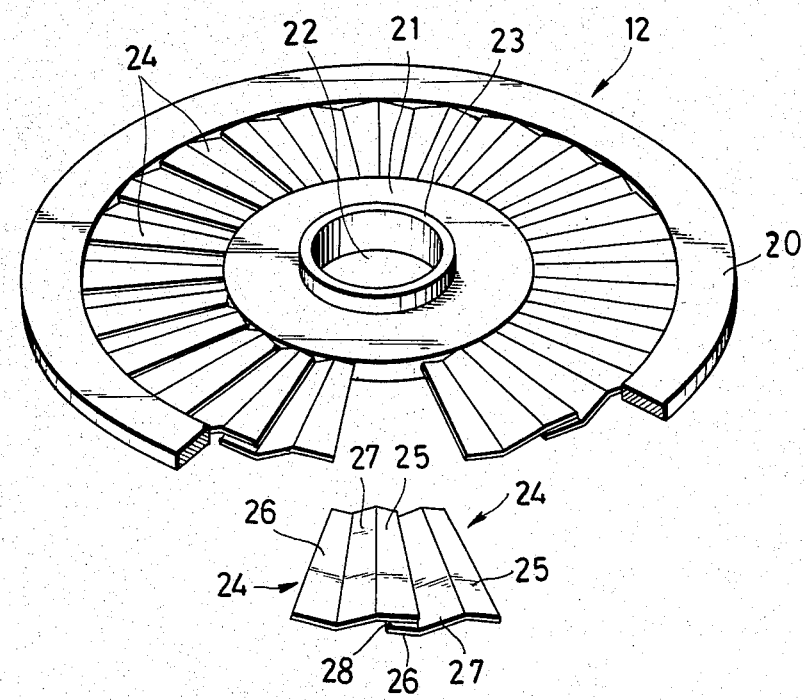
FIG. 2 is an enlarged perspective view, partly broken away for clarity, of the gas distributing plate shown in FIG. 1.

As shown in FIG. 2, the gas distributing floor 12 comprises an annular plate 20 and a circular disc 21 disposed centrally in the annular plate 20. The disc 21 has a concentric through-hole 22 surrounded by an upwardly projecting flange 23. A number of baffling plates 24 are joined at opposite ends with, and disposed circumferentially between, the annular plate 20 and the circular disc 21 in overlapping relation to one another. Each of the baffling plates 24 has a pair of upper and lower portions 25,26 extending longitudinally thereof and an intermediate portion 27 extending obliquely between the upper and lowr portions 25,26. The upper portion 25 of each baffling plate 24 overlies the lower portion 26 of an adjacent one of the baffling plates 24 so as to define therebetween an elongate slit or orifice 28 for the passage therethrough of hot air.

The baffling plates 24 are in the shape of a segment of a circle as viewed from the plan and the upper, lower and intermediate portion 25,26,27 all extend substantially radially between the circular disc 21 and the annular plate 20. Flows of hot air ejected from the orifices 28 impinge upon and reflected by the oblique intermediate portions 26 in a common direction so as to circulate over the distributing floor 12, thereby generating a laminar flow within the reaction chamber 15. The solid particles carried on the floor 12 are separated from one another and uniformly agaitated by the circulating hot air thereby forming a circulating fluidized bed. In the circulating fluidized bed, the solid particles are dried evenly during a relatively short period of time. The upper and lower portions 25,26 of each baffling plate 24 extend parallel with each other and the lower portion 26 inclines slightly upwardly with respect to the general plane of the circular disc 21 so as to prevent the solid particles from falling through the orifices 27 into the plenum chamber 13 especially when the dryer 10 in not in operation.

As shown in FIG. 1, a hollow cone 29 is disposed concentrically above the circular disc 21 and flares toward the external periphery of the circular disc 21. The cone 29 has at its flared end a circular edge 30 spaced from and extending substantially in vertical alignment with the external periphery of the circular disc 21 to such an extent that the flange 23 projects inside the hollow cone 29. The hollow cone 29 serves to agitate the solid particles evenly over the plane of the distributing floor 12 and prevents the solid particles from depositing on the circular disc 21 when the dryer 10 stops operation. With the cone 29 thus arranged, hot air flows through the through-hole 22 into the hollow cone 29 and then is ejected between the circular edge 30 of the cone 29 and the circular disc 21 radially outwardly over the baffling plates 24. Thus, hot air flows circulate at a higher speed within the reaction chamber 15 with the result that the solid particles can be dried evenly at a more rapid rate.

Figure 3:
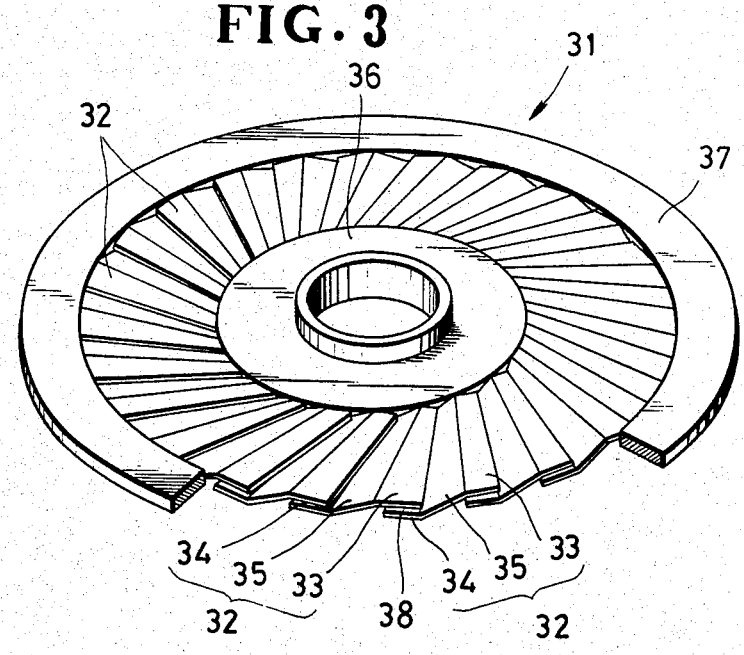
FIG. 3 is a view similar to FIG. 2, showing a modified gas distributing plate of the present invention.

A modified gas distributing floor 31 according to the present invention is shown in FIG. 3. The floor 31 is substantially the same as the floor 12 of the first embodiment described above with the exception that baffling plates 32 each have an upper portion 33, a lower portion 34 and an intermediate portion 35 which all extend between a circular disc 36 and an annular plate 37 in tangential relation to an imaginary circle (not shown) drawn in the circular disc 36 concentrically thereto. With the gas distributing floor 31 thus arranged, hot air is ejected from orifices 38 to impinge upon the inner wall of a reaction chamber (not shown), thereby generating swirls within the chamber. The solid particles are circulated by the swirls of hot air to first elevate along the inner wall of the reaction chamber and then flow down at the center of the reaction chamber. Such circulation can agitate the solid particles more uniformly during a relatively short period of time.

Although various minor modifications may be suggested by those versed in the art, it should be understood that I wish to embody within the scope of the patent warranted hereon, all such embodiments as reasonably and properly come within the scope of my contribution to the art.

What I claim is:

1. A gas distributing floor for a circulating fluidized-bed dryer or the like, comprising:
   (a) an annular plate;
   (b) a circular disc disposed centrally in said annular plate; and
   (c) a number of elongate baffling plates joined at opposite ends with, and disposed circumferentially between, said annular plate and said circular disc in overlapping relation to one another, each said baffling plate having a pair of upper and lower portions extending longitudinally thereof and an intermediate portion extending obliquely between upper and lower portions, said upper portion of each baffling plate overlying said lower portion of an adjacent one of said baffling plates so as to define therebetween an elongate orifice for the passage therethrough of gas, each said lower portion inclining slightly upwardly with respect to the general plane of said circular disc from its intersection with said intermediate portion to its outer extremity.

2. A gas distributing floor according to claim 1, each said baffling plate being in the shape of a segment of a circle, said upper, lower and intermediate portions extending substantially radially between said circular disc and said annular plate.

3. A gas distributing floor according to claim 1, said upper and lower portions extending in substantially parallel planes.

4. A gas distributing floor according to claim 1, said upper, lower and intermediate portions extending substantially in tangential relation to an imaginary circle drawn in and concentric to said circular disc.

5. A gas distributing floor for a circulating fluidized-bed dryer or the like, comprising:
   (a) an annular plate;
   (b) a circular disc disposed centrally in said annular plate; and
   (c) a number of elongated baffling plates joined at opposite ends with, and disposed circumferentially between, said annular plate and said circular disc in overlapping relation to one another, each said baffling plate having a pair of upper and lower portions extending longitudinally thereof and an intermediate portion extending obliquely between upper and lower portions, said upper portion of each baffling plate overlying said lower portion of an adjacent one of said baffling plates so as to define therebetween an elongate orifice for the passage therethrough of gas, said circular disc having a concentric hole, further including a hollow cone disposed concentrically above and flaring toward said circular disc, said circular disc having at its flared end a circular edge spaced from said circular disc in vertical alignment with the external periphery of said circular disc.

6. A gas distributing floor according to claim 5, said circular disc having a flange surrounding said hole and extending inside said hollow cone.

* * * * *